No. 808,916. PATENTED JAN. 2, 1906.
W. T. GORDON.
DRAPER.
APPLICATION FILED APR. 12, 1905.
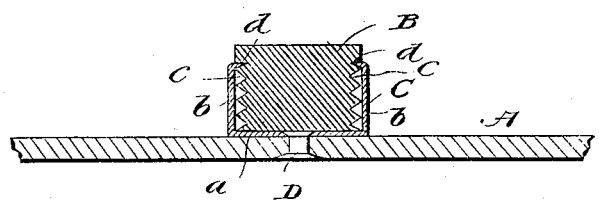
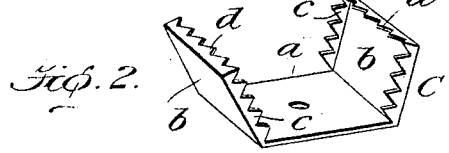
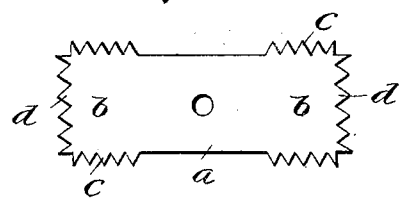
Witnesses
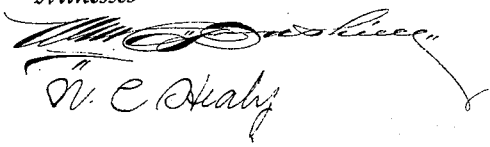
Inventor
W. T. Gordon.
By James Sheehy
Attorney.

UNITED STATES PATENT OFFICE.

WALTER T. GORDON, OF JUNIPER, OREGON.

DRAPER.

No. 808,916.   Specification of Letters Patent.   Patented Jan. 2, 1906.

Application filed April 12, 1905. Serial No. 255,244.

*To all whom it may concern:*

Be it known that I, WALTER T. GORDON, a citizen of the United States, residing at Juniper, in the county of Umatilla and State of Oregon, have invented new and useful Improvements in Drapers, of which the following is a specification.

My invention pertains to drapers, and more particularly to means for connecting the slats of drapers to the belts thereof; and it consists in the peculiar and advantageous construction hereinafter described, and particularly pointed out in the claim appended.

In the accompanying drawings, forming part of this specification, Figure 1 is a detail section, on an enlarged scale, illustrating my improved means as connecting a slat of a draper to the belt thereof. Fig. 2 is a perspective view of the slat-holder of my novel connecting means. Fig. 3 is a plan view of the malleable-metal blank of which the said slat-holder is formed. Fig. 4 is a perspective view of a modified slat-holder or clip, hereinafter referred to in detail.

Similar letters designate corresponding parts in all of the views of the drawings, referring to which—

A is a draper-belt, which may be and preferably is of the ordinary construction.

B is a slat, preferably of wood, arranged on the belt in the ordinary well-known manner.

C is the slat-holder or clip of my novel connecting means, and D is a rivet which I prefer to employ for connecting the slat-holder or clip to the belt. As best shown in Figs. 2 and 3, the slat-holder or clip C, which is of malleable or other suitable sheet metal, comprises a base $a$ and arms $b$, extending upwardly from opposite ends of the base $a$ and having inwardly-directed teeth $c$ on their opposite upright edges throughout the length thereof and also having, by preference, inwardly-directed teeth $d$ on their free edges or upper ends throughout the length thereof.

In the practical use of my improvements the slat-holder or clip C is arranged with its arms $b$ inclined slightly outward on the belt A and is connected to the said belt through the medium of the rivet D or any other means compatible with the purpose of my invention. The slat B is then seated in the holder or clip C, after which the arms $b$ of the holder or clip are pressed inwardly, when, as will be readily observed, the teeth $c$ and $d$ will be embedded in opposite sides of the slat and the slat will be securely fastened between the arms $b$ and in the holder or clip. It will also be observed that in virtue of the teeth $c$ extending throughout the length of the upright edges of the arms $b$—*i. e.*, from the base $a$ upwardly—the said arms $v$ are enabled to securely hold the slat to the belt until the slat and the said arms $b$ are worn down to a point in close proximity to the base $a$ of the holder or clip. This will be appreciated as a highly important advantage when it is borne in mind that it materially prolongs the usefulness and efficiency of the draper as a whole.

My invention contemplates the employment of two or more holders or clips in the connection of each slat to the belt; but as the said holders or clips are identical in construction I have deemed the illustration in the drawings sufficient.

In addition to the practical advantage hereinbefore ascribed to my novel slat-holder or clip C it will be appreciated that the same is simple, inexpensive, and light and is adapted to quickly effect the connection of a draper-slat to the belt.

The modified clip C' shown in Fig. 4 is similar in construction to that shown in Figs. 1 to 3, except that its arms $b'$ have rounded edges bearing inwardly-directed teeth $c'$. It will be noted that when the base $a'$ of clip C' is connected to a belt of leather, chain, or other material compatible with the purpose of my invention it will have all of the advantages ascribed to the clip C of Figs. 1 to 3.

When desirable, a transverse rivet (not shown) may be passed through the arms of the clips and the slats to compress the arms of the clips against opposite sides of the slats and assure the embedding of the teeth in the slats.

Having described my invention, what I claim, and desire to secure by Letters Patent, is—

In a draper or the like, the combination of a belt, a slat, and a slat-holder or clip comprising a base interposed between the slat and the belt and fixed with respect to the latter, and arms having inwardly-directed teeth on their edges throughout the length of the said edges; the said teeth being embedded in opposite sides of the slat.

In testimony whereof I have hereunto set my hand in presence of two subscribing witnesses.

WALTER T. GORDON.

Witnesses:
M. C. SIKTBERG,
W. F. HAYDEN.